3,499,962
ENCAPSULATION OF WATER INSOLUBLE MATERIALS
Otto B. Wurzburg, Whitehouse Station, Paolo C. Trubiano, Somerville, and William Herbst, Watchung, N.J., assignors to National Starch and Chemical Corporation, New York, N.Y., a corporation of Delaware
No Drawing. Filed Aug. 24, 1967, Ser. No. 662,858
Int. Cl. A61j 3/07; A61k 15/02
U.S. Cl. 424—35
4 Claims

ABSTRACT OF THE DISCLOSURE

Discrete particles comprising a water insoluble material enveloped or encapsulated in a protective matrix derived from an amylose product. A method for preparing such particles which comprises the steps of dissolving an amylose product in water, admixing the resulting solution with a water insoluble material so as to form a homogenized emulsion, and thereafter drying the emulsion by any suitable means in order to form dry, discrete particles. Depending upon the nature of the particular material which is being encapsulated, such particles may be used in food, cosmetic, detergent and pharmaceutical applications, etc.

BACKGROUND OF THE INVENTION

It is well known in the art that discrete particles containing water insoluble oils, molten solids, or oil solutions of water insoluble materials entrapped therein may be produced by preparing aqueous emulsions of such materials in the presence of a congealable, film-forming colloid which, upon drying and solidification, will form a matrix around the minute oil droplets. Many advantages are derived from the use of water insoluble materials when they are prepared in this form. Thus, for example, encapsulated liquid substances may be handled more conveniently without the fear of spillage or leakage. In addition, the use of volatile flavoring oils and perfumes in food and cosmetic applications is not hampered by rapid volatilization and consequent loss of such volatile components. Moreover, certain substances, such as vitamin A, which are susceptible to deterioration upon their exposure to air or atmospheric oxygen may be shielded from such exposure and thereby be maintained without any reduction in their activity and effectiveness. These solid particles may be readily converted into tablet form. Liquids and solids which are toxic or corrosive may also be embedded in the protective matrix in order to eliminate the potential hazards which are inherent in the use of such materials when they are in their conventional form. The ease and uniformity with which such materials as insecticides are applied is also greatly facilitated when they are in the form of dry, free flowing particles.

Among the prior art water dispersible protective colloids are included gelatin, gum acacia, pectin, gum tragacanth, starch and dextrin, etc. Although gelatin is characterized by its rapid gelling ability, its excellent film properties and the oxygen impermeability of its films, it is also characterized by high cost, limited availability and variations in properties from batch to batch. On the other hand, although conventional starches and dextrins are not subject to the latter disadvantages, they do not provide the desirable tough, pliable, oxygen impermeable matrices of the type derived from gelatin. Thus, such starch products either do not congeal with sufficient rapidity and/or they do not exhibit the adequate film integrity or continuity which is necessary in order to provide impermeable films or matrices.

SUMMARY OF THE INVENTION

It is, thus, the prime object of this invention to provide novel protective colloids for use in the encapsulation of water insoluble materials.

It is a further object to provide novel protective colloids which are generally superior in their encapsulating ability to the other materials heretofore employed for this purpose.

Various other objects and advantages of this invention will become apparent to the practitioner from the following detailed description.

We have found that the use, as encapsulating agents, of certain amylose products, as hereinafter defined, results in the preparation of encapsulated water insoluble materials which exhibit markedly superior characteristics. Thus, the films or matrices which are derived from these amylose products and which serve to provide the protective shell for the encapsulated water insoluble materials of this invention are characterized by their ability to congeal rapidly as well as by their toughness, strength and impermeability. It is the presence of each one of the latter characteristics to a high attainable level that defines the unexpected superiority, as encapsulating agents, of the amylose products of this invention. This is to be contrasted wtih conventional, low amylose starches and dextrins wherein the desired properties, if present at all, are exhibited only to a minimal level. Furthermore, the use of these amylose products as encapsulating agents enables the practitioner to encapsulate a vast number of water insoluble materials while the encapsulated products derived from the use of these novel encapsulating agents are, in all cases, dry, conveniently handled products.

DESCRIPTION OF THE PREFERRED EMBODIMENT

It is well known that starch is generally composed of two fractions, one a linear fraction known as amylose, and the other a branched fraction known as amylopectin. Each starch type contains these two fractions in a specific ratio characteristic of that particular starch, typical amylose concentrations ranging from about 18 to 30%, by weight. Since the amylose molecules are linear and contain hydroxyl groups, they have a tendency to be attracted to each other and to align themselves by the association, as, for example, by hydrogen bonding, through the hydroxyl groups on neighboring molecules. This phenomenon of molecular association through hydrogen bonding is commonly referred to as retrogradation and is generally manifested by crystallization from aqueous dispersions and the formation of rigid gels. On the other hand, the highly branched structure of amylopectin keeps its molecules from approaching each other closely enough to permit the extensive hydrogen bonding necessary for retrogradation to occur. As a result, aqueous dispersions of amylopectin exhibit good solution stability and do not gel.

The superior encapsulating ability of the amylose products utilized as encapsulating agents in this invention is believed to result from the presence therein of this increased concentration of linear molecules and the corresponding increase in the association and the alignment thereof. Thus, as a result of such increased association, these amylose products exhibit more rapid rates of setting and congealing as well as the ability to provide strong, impermeable films or matrices.

It is to be noted that when we use the term "amylose product" for the purposes of this invention, we refer to the amylose resulting from the fractionation of whole starch into its respective amylose and amylopectin components, or to whole, high amylose starch which is composed of at least about 40%, by weight, of amylose, or to mixtures of conventional and high amylose starches which contain at least about 40%, by weight, of amylose. In each instance, the amylose or high amylose starch may be further treated as with heat and/or acids or with oxidizing agents to form so called dextrins and thin boiling products; it being essential, in these instances, to avoid excessive conversion in order to enable the resulting products to retain their basic film properties. In addition, the amylose may be mildly chemically derivatized, as by means of an esterification procedure which would thus yield amylose esters such, for example, as the acetate, propionate and butyrate esters as well as the alkenyl succinate half esters; or by means of an etherification reaction which would thus yield amylose ethers such, for example, as the hydroxyethyl, hydroxypropyl and carboxymethyl ethers.

The decision as to whether a modified amylose product will be used as well as to the nature and the extent of the modification should be made in light of the drying and recovery method which is to be used, the characteristics of the material being encapsulated and the properties desired in the encapsulated product. Thus, for example, if it is desired to obtain a high degree of water insensitivity in the final product, it might be advisable to utilize an underivatized amylose product in the preparation thereof. However, since such amylose products require the maintenance of high temperatures in the emulsification step, their use might not be advisable in the encapsulation of thermally sensitive and/or volatile materials wherein a modified amylose product which does not require the high temperatures could be used to better advantage.

In using amylose products as encapsulating agents for the entrapment of water insoluble materials, it is first necessary to dissolve them in water, the resulting solution preferably having a pH level of from about 3 to 8. The preparation of these solutions is usually accomplished, under agitation, by submitting the aqueous amylose dispersion to a cooking operation which is typically conducted at temperatures ranging from about 90 to 180° C. and, when said temperature exceeds 100° C., at pressures ranging up to about 120 pounds per square inch. The solubilization of the amylose product may also be accomplished by mild derivatization of the high amylose starches thus enabling the resulting amylose derivatives to be cooked by conventional means such as open kettle cooking at atmospheric pressures. High amylose starches as well as derivatives and other modifications thereof may also be precooked by drum drying, spray drying, alcohol precipitation and other suitable drying means, the resulting products thereby being capable of undergoing redispersion merely by being admixed with cold water. Furthermore, solubilization may be accomplished by utilizing caustic or other chemical peptizing agents in the aqueous dispersions.

After dissolution of the amylose product is complete, the water insoluble material which is to be encapsulated (e.g. the oil, perfume, molten solid, oil solution of a water insoluble material or the like) is slowly added and the mixture is subjected to rapid agitation until such time as emulsification is complete. The continuous phase of the resulting emulsion is the aqueous solution of the amylose product while its discontinuous phase comprises the droplets of the water insoluble material. Complete emulsification is generally indicated when the average size of the particle in the emulsion is approximately 6 microns or less. Furthermore, it is preferable to maintain the temperature of the system above 140° F. during the emulsification procedure in order to prevent the possibility of premature retrogradation of the amylose product. Such premature retrogradation may be, alternatively, prevented by the presence in the system of a stabilizer, such as calcium chloride, urea and formaldehyde, etc., or by the use of an amylose derivative such as an acetate ester or a hydroxypropyl ether, etc. as the encapsulating agent.

The resulting emulsion may then be dried by any suitable means, the choice of such means being dependent upon the amylose product which is being utilized as the encapsulating agent and the conditions which the active ingredient will tolerate as well as on the ultimate form of encapsulated product which is desired, e.g. powders, beadlets, etc. Applicable drying procedures include: congealing in an inert liquid medium, spray drying, spray chilling, drum drying, extrusion, etc.

Thus, a typical drying procedure involves pouring the emulsion, under agitation, into an inert oil such as castor oil, corn oil, cottonseed oil, soyabean oil and mineral oil, etc. The oil is initially maintained at a temperature of from about 15 to 35° C. and, upon completion of the addition step, is cooled to a temperature of from about 0 to 15° C. and thoroughly agitated in order to insure the formation of a discrete beadlet. The resulting beadlets are removed from the inert oil, washed with a solvent, such as hexane, which is inert to the components of the beadlets and which will remove the oil, and then dried.

Another method of preparing the dry, encapsulated particles of this invention involves ejecting droplets of the emulsion from a spray nozzle onto a stationary layer of inert oil in such a manner that the particles do not run together. The congealing, which is partially accomplished during the free fall of the droplets through the air, is then completed by chilling the inert oil. The resulting beadlets may then be removed from the oil, washed and dried.

A variation on the latter procedure involves spraying the emulsion in such a manner as to deposit the resulting droplets in a bed of pre-dried starch. Thus, the particulate form of the beadlet is attained by congealing and the subsequent transfer of moisture from the beadlets to the pre-dried starch. For this purpose, it is preferable to employ a so-called hydrophobic starch, i.e. a starch which has been treated to exhibit hydrophobicity to such an extent that they are resistant to being wet by water. Among the applicable hydrophobic starches are those whose preparation is described in U.S. Patent No. 2,613,206. A screening operation may then be used to isolate the beadlets.

Furthermore, a spray drying operation may be utilized for the simultaneous preparation and drying of the encapsulated particles of this invention. This operation may be conducted in any commercially available spray drying equipment and involves atomizing the emulsion containing the amylose product and the water insoluble material and then contacting the atomized particles with either air or a drying gas which is introduced into the drier at a temperature which is usually higher than the temperature of the sprayed emulsion in order to be able to remove the water therefrom. In this procedure typical inlet temperatures range from about 70 to 300° C. while typical outlet temperatures range from about 80 to 150° C. By means of this process, the encapsulated product obtained is in the form of a fine powder.

Still another drying method involves spreading a thin layer of the hot emulsion on a cooled surface so as to form a thin, gelled sheet which is thereupon dried and comminuted to the desired particle size.

The hot emulsion may also be extruded through a cooled die so as to simultaneously gel the emulsion and form it into filaments. These filaments are then air dried and comminuted to the desired particle size.

In addition, drying may also be effected by passing the emulsion over heated drums, by spreading it on belts which are then passed through a heating tunnel, or, by freeze-drying. The products resulting from each of the latter drying methods are then usually comminuted to the desired particle size.

Regardless of the drying procedure which is employed, the resulting encapsulated particles are, in all cases, dry, stable, particulate solids which, as a result of their excellent film strength and integrity, are easily handled by conventional mixing or packaging apparatus without danger of breakage or other damage. Either chemical or physical means may then be effectively utilized in order to effect the release of the entrapped materials. The proper choice of release system will also enable the practitioner to make full use of the slow release characteristics of these encapsulated particles.

With regard to proportions, there are no precise limits. The aqueous emulsion may ordinarily contain from about 10 to 50%, by weight, of the amylose product. The amount of water insoluble material which is present in these emulsions is also subject to variation, depending upon the particular amylose product and the water insoluble material which is being emulsified. Thus, in some cases, one may encapsulate as much as 60% of the substance to be entrapped, the latter concentration being based on the total weight of the resulting dry particle. It should be noted that all types of oils, perfumes and other relatively water-insoluble materials are fully compatible with the encapsulating agents of this invention.

As previously noted, among the possible applications for such encapsulated particles, one may list their use in foods, animal feeds, cosmetics, spices, pharmaceuticals, soaps, detergents, bleaches and cleansers, etc. Since any active ingredient may thus be entrapped, other suitable uses will be apparent to those skilled in the art.

The following examples will more fully illustrate the embodiment of our invention. All parts given are by weight, unless otherwise noted.

EXAMPLE I

This example illustrates the use of high amylose products as encapsulating agents in the process of this invention.

The encapsulating agent utilized in this example was a high amylose corn starch which contained 70%, by weight, of amylose. An aqueous solution thereof was prepared by admixing 30 parts of the high amylose corn starch with 70 parts of water and thereafter subjecting the resulting dispersion, while under agitation, to a pressure cooking operation conducted at a temperature of 150° C. and at a pressure of 80 p.s.i. The resulting amylose solution was then admixed with 14.5 parts of stabilized vitamin A palmitate and the mixture subjected to high speed agitation in order to form a homogenized emulsion containing particles dispersed therein which had an average size of 4 microns.

The emulsion was then added, under agitation, to 500 parts of corn oil which was maintained at a temperature of 25° C. thereby forming a beadlet slurry in the corn oil. The system was maintained at 25° C. for a period of 10 minutes whereupon it was cooled to 10–15° C. for an additional period of 20 minutes; the latter cooling operation serving to sufficiently harden the amylose matrix around the encapsulated vitamin A droplets. The beadlets were then filtered from the oil slurry, washed with hexane in order to remove the residual corn oil, and dried at a temperature of 40° C. for a period of one hour.

The product thus prepared contained about 33%, by weight, of vitamin A palmitate and was in the form of spherical beadlets having an average diameter of about 1 mm. These particles were dry, stable, free flowing solids which were easily handled without any breakage or other damage.

EXAMPLE II

This example illustrates the wide variety of amylose products, inert oils and water insoluble materials which can be effectively used in preparing the novel encapsulated products of this invention.

The beadlets in this example were prepared according to the general procedures set forth in Example I, hereinabove. The components which were used in their preparation are described in the following table:

| Formulation # | 1 | 2 | 3 | 4¹ | 5 | 6² | 7³ |
|---|---|---|---|---|---|---|---|
| Components: | | | | | | | |
| A high amylose corn starch containing 70%, by wt., of amylose | 30 | | | | 80 | | |
| A high amylose corn starch containing 55%, by wt., of amylose | | | | | | 15 | |
| A high amylose corn starch containing 70%, by wt., of amylose which had been acid converted with 2%, by wt., sulfuric acid for a period of 16 hours at 52° C | | | 30 | | | | |
| An acid-ester of a high amylose corn starch which had been prepared by reacting a high amylose corn starch containing 70%, by wt., of amylose with octenyl succinic acid anhydride according to the procedure set forth in Ex. I of U.S. Patent No. 2,661,349 | | 30 | | | | | 10 |
| Amylose resulting from the fractionation of potato starch | | | | 15 | | | |
| Corn starch | | | | | | | 46.5 |
| Water | 70 | 70 | 70 | 115 | 170 | 85 | 377 |
| Vitamin A palmitate | 14.5 | 14.5 | 14.5 | 15 | | | 9.5 |
| Orange flavor oil | | | | | 20 | | |
| Pyrethrum extract | | | | | | 10 | |
| Corn oil | | 500 | 500 | | | | |
| Cottonseed oil | 500 | | | | 500 | 500 | 500 |
| Mineral oil | | | | 500 | | | |

¹ The anylose was initially dissolved by pressure cooking at 165° C. and 80 p.s.i.
² The amylose product was initially dissolved by pressure cooking at 135° C. and 30 p.s.i.
³ This formulation contained a total amylose content of 40%, by weight. Furthermore, only 133 parts of the amylose solution were utilized in preparing the vitamin A emulsion.

In each instance, uniform, spherical beadlets were produced. These particles were dry, stable, free flowing solids which could be readily handled.

EXAMPLE III

This example illustrates the effective use of a variety of drying procedures in order to prepare the novel encapsulated products of this invention.

Utilizing the procedure set forth in Example I for dissolving the amylose product, a solution was prepared containing 60 parts of water in which were dissolved 40 parts of a high amylose corn starch containing 70%, by weight, of amylose which had been acid converted with 2%, by weight, of sulfuric acid for 16 hours at 52° C. This solution was admixed with 19 parts of stabilized vitamin A palmitate and a homogenized emulsion prepared therefrom by utilizing the emulsification procedure described in Example I. Portions of the resulting emulsion were then, respectively, subjected to each of the following drying procedures:

Spraying over surface of inert oil

In this procedure, which is described in greater detail in U.S. Patent No. 3,143,475, the emulsion sample was sprayed, at spaced intervals, onto the surface of a quantity of corn oil which was maintained at a temperature of 35° C. in a manner that the emulsion droplets did not run into each other. The continuously agitated oil was then cooled to 10° C. and maintained at that temperature for a period of 30 minutes in order to complete the gelling of the emulsion droplets. The resulting beadlets were then filtered from the oil, washed with hexane in order to remove the residual corn oil, and dried. Uniform, free flowing beadlets were thus prepared.

Spray congealing

In this procedure, which is described in greater detail in U.S. Patent No. 2,756,177, a portion of the above described emulsion was sprayed into the air by means of a spray nozzle. The resulting droplets, which partially congealed during their free fall, were caught in a bed of pre-dried hydrophobic starch which had a moisture content of 4%, by weight; the latter starch having been prepared by means of the procedure set forth in U.S. Patent No. 2,613,266. This low moisture content enabled the starch to absorb substantially all of the moisture content of the beadlets which were collected therein. The thus congealed beadlets were then separated from the starch bed by means of a screening procedure whereupon they were dried at a temperature of 35° C. for a period of 30 minutes. The resulting beadlets were uniformly shaped and exceptionally free flowing.

Spray drying

A portion of the above described emulsion was spray dried using a commercial spray drier whose inlet temperature was 210° C. and whose outlet temperature was 90° C. The spray dried product, which was in the form of a fine white powder, was characterized by its excellent stability.

EXAMPLE IV

This example illustrates the importance of the use of our designed amylose products as the encapsulating agents in the process of this invention.

Thus, the products of this example were prepared according to the procedures set forth in Example I, hereinabove. However, since conventional, i.e. low amylose, starches were being used as the encapsulating agents in these formulations, initial solubilization of the respective starch products was accomplished by heating their aqueous dispersions in a boiling water bath for a period of 30 minutes.

The components utilized in the attempted preparation of satisfactory beadlets are described in the following table:

| | Parts | | |
|---|---|---|---|
| Formulation # | 1 | 2 | 3 |
| Components: | | | |
| Corn starch (27%, by weight, of amylose) | 30 | | |
| A waxy maize starch (0%, by weight, of amylose) | | 30 | |
| A dextrinized corn starch | | | 30 |
| Stabilized vitamin A palmitate | 14.5 | 14.5 | 14.5 |
| Water | 70 | 70 | 70 |
| Cottonseed oil | 500 | 500 | 500 |

It is to be noted that it was not possible to obtain discrete, uniform, stable beadlets utilizing any of the above listed low amylose starch products in the oil congealing procedure described hereinabove. Thus, in using the components of Formulation #1, the beadlets upon being suspended in the cottonseed oil, tended to coalesce and fuse into one another thereby exhibiting poor congealing and film formation properties. Needles to say, such non-uniform particles could not be readily recovered from the cottonseed oil.

A similar result was noted with the components of Formulation #2. Thus, upon attempting to recover the beadlets from the cottonseed oil, they fused together thereby forming a rubbery mass of partially melted particles.

The product resulting from the use of the components of Formulation #3 also proved to be totally unsatisfactory. Thus, there was little congealing or film formation noted in this instance as evidenced by the total collapse of each of the partially formed beadlets upon its being introduced into the cottonseed oil which resulted in the subsequent release of the encapsulated vitamin A solution.

These poor results are to be contrasted with the excellent results obtained in Example I, hereinabove, wherein a high amylose starch was utilized as the encapsulating agent. Thus, as previously indicated, excellent congealing and film formation properties were evidenced in preparing the uniform, fee flowing beadlets of Example I.

The results summarized above thus clearly indicate the necessity for utilizing high amylose starches as encapsulating agents in preparing the novel beadlets of this invention.

EXAMPLE V

This example illustrates the excellent protection against thermal and/or oxygen instability which is provided to water insoluble materials as a result of being encapsulated in an amylose matrix typical of this invention.

Utilizing the procedure set forth in Example I for dissolving the amylose product, a solution was prepared using 50 parts of a high amylose corn starch containing 70%, by weight, of amylose and 120 parts of water. This solution was admixed with 35 parts of vitamin A palmitate and the resulting mixture subjected to high speed agitation in order to form an emulsion having an average particle size of 4 microns. The resulting emulsion was then dried by means of the "spray congealing" procedure described in Example III, hereinabove.

Control beadlets were also prepared by the above described procedures, the only distinction being the substitution of a waxy maize starch for the high amylose corn starch utilized hereinabove.

The respective beadlets were then analyzed, by means of the procedure described in U.S. Pharmacopeia, Method XVII, in order to determine the initial potency of the encapsulated vitamin A. Thereafter, the beadlets were subjected to a temperature of 45° C. and a relative humidity of 95% for a period of 4 days. Upon analyzing the aged beadlets, the following results were obtained.

| | Vitamin A Potency, Percent | |
|---|---|---|
| Encapsulating agent | Initial | After aging |
| A high amylose corn starch containing 70%, by weight, of amylose | 100 | 98.5 |
| A waxy maize starch containing 0%, by weight, of amylose | 100 | 82.5 |

The results summarized above clearly indicate the excellent protection against thermal and oxygen instability afforded by the novel beadlets of this invention and, furthermore, indicate an additional advantage in the use of the amylose encapsulating agents of this invention.

Summarizing, our invention is thus seen to provide the practitioner with an improved encapsulating material. Variations may be made in proportions, procedures and materials without departing from the scope of this invention which is defined by the following claims.

What is claimed is:

1. Dry, discrete particles containing a water insoluble material encapsulated therein, said particles comprising the dried product of an emulsion wherein the discontinuous phase is a water insoluble material and wherein the continuous phase is an aqueous solution of an amylose product containing at least about 40%, by weight, of amylose which is selected from the group consisting of the amylose resulting from the fractionation of starch, starch containing at least about 40%, by weight, of amylose and mixtures of conventional, low amylose starch with starch containing at least about 40%, by weight, of amylose.

2. The particles of claim 1, wherein said amylose product is present in said emulsion in a concentration of from about 10 to 50%, by weight.

3. The particles of claim 1, wherein said water insoluble material is vitamin A.

4. The particles of claim 1, wherein said amylose product is an alkenyl succinate half ester.

(References on following page)

References Cited

UNITED STATES PATENTS

| | | | |
|---|---|---|---|
| 2,613,206 | 10/1952 | Caldwell | 260—233.5 |
| 2,661,349 | 12/1953 | Caldwell et al. | 260—224 |
| 3,067,067 | 12/1962 | Etheridge et al. | 127—71 |
| 3,091,567 | 5/1963 | Wurzberg et al. | 167—42 |
| 3,117,014 | 1/1964 | Klug | 106—213 |
| 3,128,209 | 4/1964 | Germino et al. | 127—71 |
| 3,159,585 | 12/1964 | Evans et al. | 252—316 |
| 3,202,731 | 8/1965 | Grevenstuk et al. | 264—7 |
| 3,222,220 | 12/1965 | Wurzberg et al. | 127—32 |

S. K. ROSE, Primary Examiner

U.S. Cl. X.R.

424—344, 186, 168; 252—316, 522; 264—7; 99—118, 140, 166, 2